(12) United States Patent
Van Niekerk et al.

(10) Patent No.: US 7,871,523 B2
(45) Date of Patent: Jan. 18, 2011

(54) PURIFICATION OF WATER

(75) Inventors: Ockert Tobias Van Niekerk, 158 Roedolf Avenue, Clubview, Centurion, 0157 (ZA); Edmund Kevin Hardwick, Edenvale (ZA)

(73) Assignee: Ockert Tobias Van Niekerk, Clubview (ZA)

( * ) Notice: Subject to any disclaimer, the term of this patent is extended or adjusted under 35 U.S.C. 154(b) by 370 days.

(21) Appl. No.: 12/083,658

(22) PCT Filed: May 16, 2006

(86) PCT No.: PCT/IB2006/051530

§ 371 (c)(1),
(2), (4) Date: Jul. 18, 2008

(87) PCT Pub. No.: WO2007/046008

PCT Pub. Date: Apr. 26, 2007

(65) Prior Publication Data

US 2009/0039027 A1    Feb. 12, 2009

(30) Foreign Application Priority Data

Oct. 17, 2005   (ZA) ............................... 2005/08399

(51) Int. Cl.
*C02F 1/42* (2006.01)
(52) U.S. Cl. ..................... 210/677; 210/687
(58) Field of Classification Search .............. 210/677, 210/687
See application file for complete search history.

(56) References Cited

U.S. PATENT DOCUMENTS 6,716,344 B1    4/2004    Bassi et al.

(Continued)

FOREIGN PATENT DOCUMENTS

JP    2001070989 A  *  3/2001

(Continued)

OTHER PUBLICATIONS

PCT International Preliminary Report for International App. No. PCT/IB2006/051530, dated Apr. 22, 2008.

(Continued)

*Primary Examiner*—Chester T Barry
(74) *Attorney, Agent, or Firm*—Brinks Hofer Gilson & Lione

(57) ABSTRACT

A process for providing water with a lowered salinity and which produces at least one recoverable waste stream containing a useful by-product, the process including treating raw water which includes an undesirably high concentration of cations, including $Ca^{2+}$ and $Na^+$, in a cation exchange stage which includes first and second cation exchangers. The first cation exchanger having a selectivity towards di-valent cations and the second cation exchanger being downstream of the first cation exchanger, to retain at least a portion of the cations of the raw water in or on the first and second cation exchangers, thereby providing upgraded water of a lowered salinity containing no or a low concentration of the cations of the raw water. The process further includes from time to time, regenerating the first cation exchanger with an acid to produce a first recoverable waste stream which includes a calcium salt and removing $Na^+$ from the second cation exchanger to produce a second recoverable waste stream which includes a sodium compound, and then regenerating the second cation exchanger.

20 Claims, 1 Drawing Sheet

U.S. PATENT DOCUMENTS

2004/0226890 A1 * 11/2004 Bassi et al. .................. 210/670

FOREIGN PATENT DOCUMENTS

RU        2 104 969 C1     2/1998
RU        2104969 C1 * 2/1998

OTHER PUBLICATIONS

PCT Written Opinion for International App. No. PCT/IB2006/051530, dated Nov. 3, 2006.

PCT International Search Report for International App. No. PCT/IB2006/051530, dated Nov. 3, 2006.

Derwent Abstract Accession No. 98-465680/40 regarding RU 2 104 969, Published by Derwent, Feb. 20, 1998, 2 pages.

Derwent Abstract Accession No. 2001-321226/34 regarding JP 2001070989, Published by Derwent, Mar. 21, 2001, 3 pages.

* cited by examiner

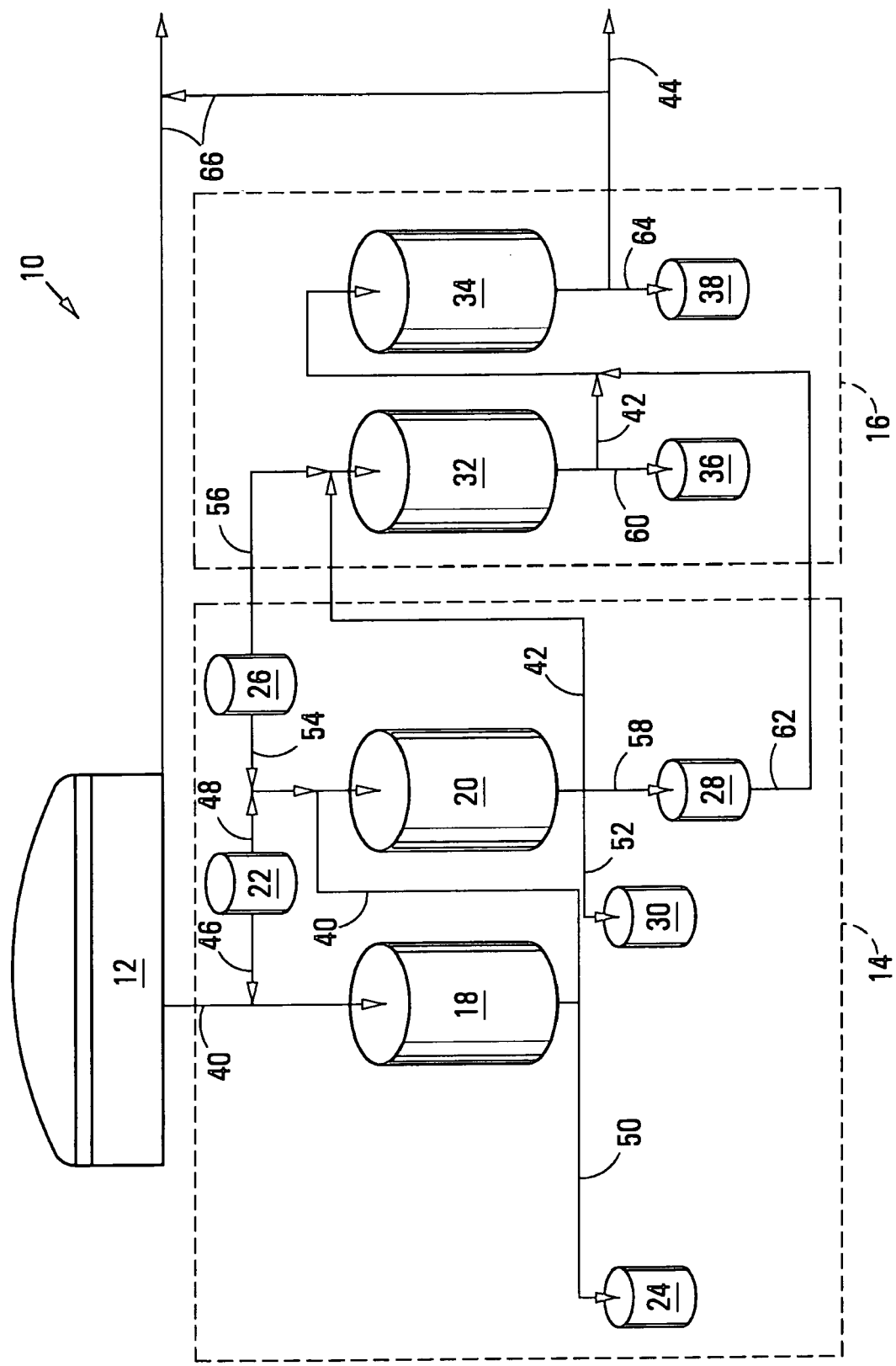

PURIFICATION OF WATER

Applicants claim, under 35 U.S.C. §119, the benefit of priority of the filing date of Oct. 17, 2005 of a Republic of South Africa patent application, copy attached, Serial Number 2005/08399, filed on the aforementioned date, the entire contents of which are incorporated herein by reference.

BACKGROUND OF THE INVENTION

1. Field of the Invention

This invention relates to the desalination of water. In particular, the invention relates to a process for providing water with a lowered salinity and which produces at least one recoverable waste stream containing a useful by-product.

2. Description of the Related Art

Water is purified on a daily basis for domestic use, for industrial use, electricity generation and many more applications. Waste water and water pumped from mining operations for example, also often have to be treated before being released into the ecosystem.

Most water treatment technologies generate a waste stream, often in the form of a brine solution, which contains the impurities that were present in the raw water stream as well as chemicals used in the purification process. The removal of the brine solution to a dumping site adds significant costs to the water purification process and is sometimes prohibitive to the implementation of a water purification process. A water treatment process which has the potential not to produce a waste stream which is not economically recoverable, would thus be advantageous.

SUMMARY OF THE INVENTION

According to the invention, there is provided a process for providing water with a lowered salinity and which produces at least one recoverable waste stream containing a useful by-product, the process including:

treating raw water which includes an undesirably high concentration of cations, including $Ca^{2+}$ and $Na^+$, in a cation exchange stage which includes at least first and second cation exchangers, the first cation exchanger having a selectivity towards di-valent cations and the second cation exchanger being downstream of the first cation exchanger, to retain at least a portion of the cations in or on the cation exchangers, thereby providing upgraded water of a lowered salinity containing no or a low concentration of the cations;

from time to time, regenerating the first cation exchanger with the selectivity towards di-valent cations with an acid to produce a first recoverable waste stream which includes a calcium salt; and from time to time, removing $Na^+$ from the second cation exchanger to produce a second recoverable waste stream which includes a sodium compound, and then regenerating the second cation exchanger.

Removing $Na^+$ from the second cation exchanger may include passing a solution that includes potassium cations through the second cation exchanger to replace the $Na^+$ cations in or on the cation exchanger with $K^+$ cations, producing the second recoverable waste stream. The potassium solution is typically a KCl solution, the second recoverable waste stream thus including NaCl as sodium compound which can be recovered.

In this specification, by "recoverable waste stream" is meant a waste stream which includes a mixture of ions in solution, with a dominant cation having a concentration of more than 90% w/w compared to other cations in solution, and with a dominant anion having a concentration of more than 90% w/w compared to other anions in solution, or a waste stream which has sufficient value rendering it economical to recover or use the waste stream and not to dump the waste stream.

Cation exchangers have different selectivity's for different cations, and it follows that the cations for which the first cation exchanger has the highest selectivity will accumulate on the first cation exchanger, and the cations for which the first cation exchanger has a lower selectivity will accumulate on the second or any further following or intervening cation exchangers. Thus, when $Ca^{2+}$ and $Na^+$ are present in the raw water, the $Ca^{2+}$ will accumulate on the first cation exchanger and the $Na^+$ will accumulate on the second cation exchanger.

From time to time the cation exchangers have to be regenerated back to the proton form. Depending on the cation that has accumulated on the cation exchanger, this could be done in accordance with the invention in a single regeneration step by an acid or in two steps by first replacing the cation with another cation, followed by regeneration with an acid.

The first cation exchanger with a selectivity towards di-valent cations is preferably a weak acidic cation exchange resin. The second cation exchanger is typically a strong acidic cation exchange resin. The cation exchange stage may thus remove cations such as $Na^+$, $Mg^{2+}$, $Ca^{2+}$, $Fe^{2+}$ and $Mn^{2+}$.

The acid with which the first cation exchanger with a selectivity towards di-valent cations is regenerated is preferably nitric acid. The first recoverable waste stream will thus typically include (dissociated) calcium nitrate and possibly also magnesium nitrate as by-products of the process, and is thus useful as a fertilizer. Typically, the first recoverable waste stream will also include residual acid, e.g. residual nitric acid. As will be appreciated, all of the ionic species referred to hereinafter will also be in dissociated form when in aqueous solution.

Thus, a cation exchanger which $Ca^{2+}$ cations accumulated on it can be regenerated in a single step with nitric acid which results in the formation of a recoverable waste stream containing calcium nitrate, useful as a fertilizer.

The process may include neutralizing the first recoverable waste stream with a base. The base may include $Ca(OH)_2$, calcium oxide or lime, thereby converting all or at least some of the residual nitric acid to calcium nitrate.

Instead, or in addition, the base may include ammonia, thereby converting all or at least some of the residual nitric acid to ammonium nitrate. The first recoverable waste stream will then include calcium nitrate and ammonium nitrate useful as fertilizers. The process may include adding all or part of this recoverable waste stream to irrigation water.

Instead, the acid with which the first cation exchanger with a selectivity towards di-valent cations is regenerated may be hydrochloric acid, the first recoverable waste stream thus including (dissociated) calcium chloride.

Removing $Na^+$ from the second cation exchanger may include passing a solution that includes potassium cations through the second cation exchanger to replace the $Na^+$ cations in or on the cation exchanger with $K^+$ cations, producing said second recoverable waste stream. The potassium solution is typically a KCl solution, the second recoverable waste stream thus including NaCl as sodium compound which can be recovered.

Instead, removing $Na^+$ from the second cation exchanger may include passing an ammonia solution ($NH_4OH$) or an $NH_4Cl$ solution through the cation exchanger, to replace the $Na^+$ cations in or on the cation exchanger with $NH_4^+$ cations, respectively producing NaOH or NaCl as sodium compound, the second recoverable waste stream thus being a recoverable or reusable caustic soda solution or a recoverable sodium chloride solution.

Regenerating the second cation exchanger may include passing an acid, e.g. nitric acid, through the cation exchanger and producing a recoverable nitrate stream. The nitrate stream will thus typically include $KNO_3$ or $NH_4NO_3$, depending on whether a potassium solution or an $NH_4^+$ solution was used to remove $Na^+$ from the second cation exchanger.

Instead of using nitric acid, or in combination with nitric acid, the acid with which the second cation exchanger is regenerated may be phosphoric acid.

The process may include passing the upgraded water through an anion exchange stage to lower the concentration of anions, including $SO_4^{2-}$ and $Cl^-$, thereby further upgrading the water. Carbonate and bicarbonate anions may be converted in the cation exchange stage to dissolved $CO_2$, as is explained in more detail hereinafter.

The anion exchange stage may include at least a first anion exchanger and a second anion exchanger, the second anion exchanger being downstream of the first anion exchanger and at least one of the anion exchangers having a selectivity towards sulphate anions or chloride anions, so that sulphate anions accumulate predominantly on one anion exchanger and chloride anions accumulate predominantly on another anion exchanger. The anion exchanger which has a selectivity towards sulphate anions or chloride anions is preferably the first anion exchanger.

Anion exchangers have different selectivities for different anions. It follows that the anions for which the first anion exchanger has the highest selectivity will accumulate on the first anion exchanger and that the anions for which the first anion exchanger has a lower selectivity will accumulate on the second or any further following or intervening anion exchangers in the series, resulting in the separation and accumulation of the different anions in the upgraded water on the different anion exchangers.

The number and type of cation exchangers and anion exchangers will depend on the cation and anion species present in the raw water, the required concentrations of these cations and anions in the upgraded water and the recoverable waste streams that can potentially be generated. As will be appreciated, the cations and/or anions can be separated so that a single dominant cation or anion is present in a cation exchanger or anion exchanger, or so that similar cations or anions, e.g. divalent or mono-valent cations or anions, are present in a cation exchanger or anion exchanger.

When the anion exchange stage is present, the process typically includes regenerating the anion exchangers from time to time. The anion exchanger on which sulphate anions have accumulated, when present, may be regenerated with an ammonia solution, producing a recoverable $(NH_4)_2SO_4$ solution which is useful as a fertilizer.

The anion exchanger on which chloride anions have accumulated, when present, may be regenerated with a caustic soda solution to produce a NaCl solution with valuable NaCl which can thus be recovered, e.g. as table salt. The caustic soda solution used for regeneration may be the recoverable caustic soda solution which may be produced in the removal of $Na^+$ from the second cation exchanger.

It is to be noted that the order of regeneration may be reversed. For example, $NH_4OH$ can be used to regenerate the anion exchanger in the $Cl^-$ form, first forming an $NH_4Cl$ solution. The $NH_4Cl$ solution can then be used to replace the $Na^+$ cations on the second cation exchanger with $NH_4^+$ cations.

The upgraded water may include high levels of carbon dioxide, caused by the addition of hydrogen to the water from the cation exchange stage, with the hydrogen reacting with carbonate and bicarbonate anions to form carbonic acid (dissolved $CO_2$). If desired, the process may include stripping the upgraded water of dissolved $CO_2$, using any conventional $CO_2$ stripping process, but in many applications the dissolved $CO_2$ will not be a concern, e.g. in irrigation applications.

The invention extends to an irrigation scheme in which at least a portion of the irrigation water is subjected to a process as hereinbefore described to upgrade the quality of the water.

The process may include removing impurities from the water prior to the water coming into contact with an ion exchanger. Examples of such impurities are suspended materials, $Fe^{2+}$ and $Mn^{2+}$ ions. These impurities may be removed by an oxidation step followed by filtration.

BRIEF DESCRIPTION OF THE DRAWINGS

The sole drawing schematically shows an embodiment of a water treatment system in accordance with the present invention.

DESCRIPTION OF THE PREFERRED
EMBODIMENT(S) OF THE INVENTION

The invention will now be described, by way of example only, with reference to the single accompanying diagrammatic drawing which shows one embodiment of a process in accordance with the invention for providing water of an improved quality and which produces at least one recoverable waste stream containing a useful by-product.

Referring to the drawing, reference numeral 10 generally indicates a process in accordance with the invention for providing water of lowered salinity and which produces at least one recoverable waste stream containing a useful by-product. The process 10 includes, broadly, a water supply 12, a cation exchange stage 14 and an anion exchange stage 16.

The cation exchange stage 14 includes a first cation exchanger 18 containing a weak acidic cation exchange resin with a high selectivity towards di-valent cations and a second cation exchanger 20 containing a strong acidic cation exchange resin. The cation exchange stage 14 further includes a nitric acid supply 22, a first recoverable waste stream tank 24, an ammonia solution supply 26, a second recoverable waste stream tank 28 and a recoverable nitrate tank 30.

The anion exchange stage 16 includes a first anion exchanger 32 which contains an anion exchange resin with a selectivity towards $SO_4^{2-}$ anions and a second anion exchanger 34 which contains another anion exchange resin. The anion exchange stage 16 further includes an ammonium sulphate solution tank 36 and a sodium chloride solution tank 38.

A raw water supply line 40 leads from the water supply 12 to the cation exchanger 18 and from the cation exchanger 18 to the cation exchanger 20. An upgraded water line 42 leads from the cation exchanger 20 to the anion exchanger 32 and from the anion exchanger 32 to the anion exchanger 34. A treated water line 44 leads from the anion exchanger 34 as a product stream of the process 10.

Nitric acid feed lines 46 and 48 lead respectively from the nitric acid supply 22 to the cation exchanger 18 and the cation exchanger 20. A first recoverable waste stream line 50 leads from the cation exchanger 18 to the first recoverable waste stream tank 24. A recoverable nitrate stream 52 leads from the cation exchanger 20 to the recoverable nitrate tank 30.

Ammonia solution feed lines 54, 56 lead respectively from the ammonia solution supply 26 to the cation exchanger 20 and to the anion exchanger 32. A second recoverable waste stream line 58 leads from the cation exchanger 20 to the second recoverable waste stream tank 28 and an ammonium sulphate line 60 leads from the anion exchanger 32 to the ammonium sulphate solution tank 36.

A caustic soda solution line 62 leads from the second recoverable waste stream tank 28 to the anion exchanger 34 and a sodium chloride line 64 leads from the anion exchanger 34 to the sodium chloride solution tank 38.

In use, raw water, such as raw irrigation water or water from a mine, is pumped from the water supply 12 through the cation exchange stage 14 and the anion exchange stage 16. In the cation exchanger 18, di-valent cations are retained and in the cation exchanger 20 mono-valent cations are retained, thereby upgrading the water and improving the quality of the water, i.e. lowering the salinity of the water. The upgraded water in the upgraded water line 42 from the cation exchanger 20 thus contains no or a low concentration of certain cations.

The raw water from the water supply 12 typically includes $Ca^{2+}$ and $Na^+$ as cations, the concentrations of which it is desired to be lowered. Very often, $Mg^{2+}$ is also a di-valent cation present in the raw water. Typically, the raw water from the water supply 12 also includes $SO_4^{2-}$ and $Cl^-$ as anions, the concentrations of which it is desired to be lowered.

In the anion exchanger 32 the $SO_4^{2-}$ anions are retained and the upgraded water then passes by the upgraded water line 42 into the anion exchanger 34 where $Cl^-$ anions are retained before the water is discharged by the treated water line 44. As will however be appreciated, the anion exchange stage 16 may not always be required, depending on the quality of the raw water. It is also possible to have the anion exchange stage precede the cation exchange stage.

$Ca^{2+}$ and $Mg^{2+}$ cations are thus retained in the cation exchanger 18 and $Na^+$ cations are retained in the cation exchanger 20. The $SO_4^{2-}$ anions are thus retained in the anion exchanger 32 and the $Cl^-$ anions are retained in the anion exchanger 34.

In the embodiment of the process of the invention as shown in the illustration, the treated water in the treated water line 44 will thus have a reduced concentration of $Ca^{2+}$, $Mg^{2+}$, $Na^+$, $SO_4^{2-}$ and $Cl^-$ ions.

From time to time, it is necessary to regenerate the cation exchangers 18, 20 and the anion exchangers 32, 34. The cation exchanger 18 is regenerated by pumping nitric acid from the nitric acid supply 22 by the nitric acid feed line 46 through the cation exchanger 18. A first recoverable waste stream is thus produced in the cation exchanger 18 which typically includes dissociated calcium nitrate and also magnesium nitrate. This first recoverable waste stream is fed by the first recoverable waste stream line 50 into the first recoverable waste stream tank 24. As will be appreciated, both calcium nitrate and magnesium nitrate are useful as fertilizer and the nitrate solution in the first recoverable waste stream tank 24 can be pumped away for use as fertilizer. This may, for example, include adding the nitrate solution to the treated water in the treated water line 44, and using the water for irrigation purposes.

The cation exchanger 20 is regenerated by first pumping an ammonia solution from the ammonia solution supply 26 by the ammonia solution feed line 54 through the cation exchanger 20. In the cation exchanger 20 the retained $Na^+$ cations are replaced with $NH_4^+$ cations producing caustic soda as a second recoverable waste stream. The caustic soda is removed from the cation exchanger 20 by the second recoverable waste stream line 58 and fed into the second recoverable waste stream tank 28. Thereafter, nitric acid from the nitric acid supply 22 is pumped by means of the nitric acid feed line 48 into the cation exchanger 20 where ammonium nitrate is produced as a recoverable nitrate by-product. By the recoverable nitrate line 52 the recoverable nitrate is pumped into the recoverable nitrate tank 30. As will be appreciated, also the ammonium nitrate solution in the recoverable nitrate tank 30 can usefully be employed as a fertilizer.

Instead of using an ammonia solution ($NH_4OH$) to remove the $Na^+$ cations from the cation exchanger 20, a potassium solution, e.g. potassium chloride, can be used, producing NaCl as a valuable recoverable by-product. If the cation exchanger 20 is thereafter regenerated with nitric acid, potassium nitrate will be produced and stored in the recoverable nitrate tank 30. Potassium nitrate is also a useful fertilizer.

The anion exchanger 32 is regenerated by pumping ammonia solution from the ammonia solution supply 26 by the ammonia solution feed line 56 into the anion exchanger 32. In the anion exchanger 32, an ammonium sulphate solution is produced. The ammonium sulphate solution is removed by the ammonium sulphate line 60 and pumped into the ammonium sulphate solution tank 36. Ammonium sulphate is also useful as a fertilizer.

The anion exchanger 34 is regenerated with a caustic soda solution. In the illustrated embodiment of the invention, the caustic soda solution is from the second recoverable waste stream tank 28. The caustic soda solution from the second recoverable waste stream tank 28 is pumped by the caustic soda solution line 62 into the anion exchanger 34 where sodium chloride in solution is produced. By the sodium chloride line 64 the sodium chloride solution is pumped into the sodium chloride solution tank 38. The sodium chloride solution in the sodium chloride solution tank 38 can be treated to produce sodium chloride in a dry form, e.g. as table salt.

In another embodiment of the invention (not shown), the order of regeneration is changed. For example $NH_4OH$ can be used to regenerate the anion exchanger 34, first forming an $NH_4Cl$ solution. The $NH_4Cl$ solution ($NH_4^+$) can then be used to replace the $Na^+$ on the cation exchanger 20.

As will be appreciated, all of the raw water from the water supply 12 can be passed through the cation exchange stage 14 and the anion exchange stage 16. Instead, only some of the water, e.g. 30% to 50%, can be treated in the cation exchange stage 14 and the anion exchange stage 16 with the treated, upgraded water being used for a specific purpose, or the treated, upgraded water may be mixed with the balance of the water withdrawn from the water supply 12 and used together, e.g. as irrigation water as shown by the flow lines 66.

In the cation exchangers 18, 20, when the cations are retained, $H^+$ cations are released into the water. As a result, the carbon dioxide level in the upgraded water may rise, and the water may even become super saturated with dissolved $CO_2$. The carbon dioxide concentration in the water is dependent on the carbonate, bicarbonate and carbonic acid equilibrium in the water. With low pH, the carbonic acid (dissolved $CO_2$) concentration in the water will tend to be high, whereas with high pH the carbonate/bicarbonate concentration in the water will tend to be high. Although not shown in the drawing, if desired, the process may include stripping the upgraded water of dissolved $CO_2$, using any conventional $CO_2$ stripping process. For irrigation purposes, the dissolved $CO_2$ however does not present a problem.

Applicants expect that the process 10 of the invention, as illustrated, can usefully be applied to water from rivers, river beds, mines and boreholes or any other source as well as water that is recycled in operations like power generation, to improve the quality, i.e. to lower the salinity of the water to such an extent that the water can be used again, including in irrigation applications, or so that the water can be released into the ecosystem, whilst at the same time producing recoverable waste streams containing valuable or useful chemicals, such as fertilizers and sodium chloride. In an investigation into possible treatments for water from a coal mine, which requires 2 million m³ of water to be treated per annum, it was shown that the process of the invention requires a capital expenditure of less than half of the capital expenditure required for the next best alternative producing brine. Furthermore, for the next best alternative, a substantial operating cost would have to be incurred, without even taking into account the cost of brine removal. Compared to this, the process of the invention, as illustrated, uses chemicals costing in most cases less than 50% of the market value of the useful, recoverable by-products in the recoverable waste streams produced by the process 10. The process of the invention, as illustrated, can thus recover its operating costs by selling the by-products in the recoverable waste streams, and does not produce any waste streams which are not recoverable.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

We claim:

1. A process for providing water with a lowered salinity and which produces at least one recoverable waste stream containing a useful by-product, the process comprising:
   treating raw water which includes an undesirably high concentration of cations, including $Ca^{2+}$ and $Na^+$, in a cation exchange stage which comprises first and second cation exchangers, the first cation exchanger having a selectivity towards di-valent cations and the second cation exchanger being downstream of the first cation exchanger, to retain at least a portion of the cations of the raw water in or on the first and second cation exchangers, thereby providing upgraded water of a lowered salinity containing no or a low concentration of the cations of the raw water;
   from time to time, regenerating the first cation exchanger with an acid to produce a first recoverable waste stream which includes a calcium salt; and
   from time to time, removing $Na^+$ from the second cation exchanger to produce a second recoverable waste stream which includes a sodium compound, and then regenerating the second cation exchanger.

2. The process as claimed in claim 1, in which the first cation exchanger is a weak acidic cation exchange resin, and the second cation exchanger is a strong acidic cation exchange resin.

3. The process as claimed in claim 1, in which the acid with which the first cation exchanger is regenerated is nitric acid, the first recoverable waste stream thus including (dissociated) calcium nitrate.

4. The process as claimed in claim 1, in which the acid with which the first cation exchanger is regenerated is hydrochloric acid, the first recoverable waste stream thus including (dissociated) calcium chloride.

5. The process as claimed in claim 3, in which the first recoverable waste stream includes residual nitric acid and which includes neutralizing the first recoverable waste stream with a base.

6. The process as claimed in claim 5, in which the base includes $Ca(OH)_2$, calcium oxide or lime, thereby converting all or at least some of the residual nitric acid to calcium nitrate.

7. The process as claimed in claim 5, in which the base includes ammonia, thereby converting all or at least some of the residual nitric acid to ammonium nitrate, the first recoverable waste stream then including calcium nitrate and ammonium nitrate.

8. The process as claimed in claim 1, which includes adding all or part of the first recoverable waste stream to irrigation water.

9. The process as claimed in claim 1, in which removing $Na^+$ from the second cation exchanger includes passing a solution that includes potassium cations through the second cation exchanger to replace the $Na^+$ cations in or on the second cation exchanger with $K^+$ cations, producing the second recoverable waste stream.

10. The process as claimed in claim 9, in which the potassium solution is a KCl solution, the second recoverable waste stream thus including NaCl as sodium compound which can be recovered.

11. The process as claimed in claim 1, in which removing $Na^+$ from the second cation exchanger includes passing an ammonia solution ($NH_4OH$) or an $NH_4Cl$ solution through the second cation exchanger, to replace the $Na^+$ cations in or on the second cation exchanger with $NH_4^+$ cations, respectively producing NaOH or NaCL as sodium compound, the second recoverable waste stream thus being a recoverable or reusable caustic soda solution or a recoverable sodium chloride solution.

12. The process as claimed in claim 1, in which regenerating the second cation exchanger includes passing nitric acid through the second cation exchanger and producing a recoverable nitrate stream.

13. The process as claimed in claim 1, in which regenerating the second cation exchanger includes passing phosphoric acid through the second cation exchanger.

14. The process as claimed in claim 1, which includes passing the upgraded water through an anion exchange stage to lower the concentration of anions, including $SO_4^{2-}$ and $Cl^-$, thereby further upgrading the water.

15. The process as claimed in 14, in which the anion exchange stage comprises a first anion exchanger and a second anion exchanger, the second anion exchanger being downstream of the first anion exchanger and at least one of the first and second anion exchangers having a selectivity towards sulphate anions or chloride anions, so that sulphate anions accumulate predominantly on one of the first and second anion exchangers and chloride anions accumulate predominantly on an other one of the first and second anion exchangers.

16. The process as claimed in claim 15, which includes regenerating the first and second anion exchangers from time to time, the one of the first and second anion exchangers on which sulphate anions have accumulated being regenerated with an ammonia solution, producing a recoverable $(NH_4)_2SO_4$ solution.

17. The process as claimed in claim 15, which includes regenerating the first and second anion exchangers from time to time, the other one of the first and second anion exchangers on which chloride anions have accumulated being regenerated with a caustic soda solution to produce a NaCl solution.

18. The process as claimed in claim 1, wherein the raw water is irrigation water.

19. The process as claimed in claim 17, in which removing $Na^+$ from the second cation exchanger includes passing an ammonia solution ($NH_4OH$) or an $NH_4Cl$ solution through the second cation exchanger, to replace the $Na^+$ cations in or on the second cation exchanger with $NH_4^+$ cations, respectively producing NaOH or NaCl as sodium compound, the second recoverable waste stream thus being a recoverable or reusable caustic soda solution or a recoverable sodium chloride solution, and in which the caustic soda solution used for regeneration is the recoverable caustic soda solution produced in the removal of $Na^+$ from the second cation exchanger.

20. The process as claimed in claim 15, in which removing $Na^+$ from the second cation exchanger includes passing an ammonia solution ($NH_4OH$) or an $NH_4Cl$ solution through the second cation exchanger, to replace the $Na^+$ cations in or on the second cation exchanger with $NH_4^+$ cations, respectively producing NaOH or NaCl as sodium compound, the second recoverable waste stream thus being a recoverable or reusable caustic soda solution or a recoverable sodium chloride solution, and which includes regenerating the first and second anion exchangers from time to time, the other one of the first and second anion exchangers on which chloride anions have accumulated being regenerated with $NH_4OH$ forming an $NH_4Cl$ solution, and then using the $NH_4Cl$ solution to replace the $Na^+$ cations on the second cation exchanger with $NH_4^+$ cations.

* * * * *